United States Patent [19]

Moore

[11] Patent Number: 4,490,260
[45] Date of Patent: Dec. 25, 1984

[54] MECHANICAL CONDITIONING AND FLOCCULATION OF LIQUIDS

[75] Inventor: Richard P. Moore, Germiston, South Africa

[73] Assignee: Blue Circle Projects (Proprietary) Limited, Germiston, South Africa

[21] Appl. No.: 579,298

[22] Filed: Feb. 16, 1984

Related U.S. Application Data

[63] Continuation of Ser. No. 436,656, Oct. 26, 1982, abandoned.

[30] Foreign Application Priority Data

Oct. 26, 1981 [ZA] South Africa ..................... 81/7382

[51] Int. Cl.$^3$ .............................................. C02F 1/52
[52] U.S. Cl. ................... 210/738; 210/202; 210/208; 210/219; 210/520
[58] Field of Search ............... 210/738, 202, 205, 206, 210/207, 208, 232, 237, 238, 219, 520, 530

[56] References Cited

U.S. PATENT DOCUMENTS

| | | | |
|---|---|---|---|
| 2,062,988 | 12/1936 | Collow | 210/530 |
| 2,185,785 | 1/1940 | Dorr | 210/520 |
| 2,253,878 | 8/1941 | Weber | 210/738 |
| 2,274,361 | 2/1942 | Darby | 210/738 |
| 2,276,300 | 3/1942 | Green | 210/206 |
| 2,382,409 | 8/1945 | Finney | 210/530 |
| 2,413,692 | 1/1947 | Crowther | 210/208 |
| 2,425,065 | 8/1947 | Kivari | 210/738 |
| 3,314,547 | 4/1967 | Kivell | 210/520 |
| 3,532,218 | 10/1970 | Blottnitz | 210/207 |
| 4,297,221 | 10/1981 | Moll | 210/207 |

Primary Examiner—Ernest G. Therkorn
Attorney, Agent, or Firm—Bacon & Thomas

[57] ABSTRACT

This invention relates to flocculation apparatus for the purification of liquids, particularly water, wherein provision is made for initial vigorous mixing of the coagulants in the liquid followed by a gradually diminishing agitation of the liquid and flocculent to provide proper flocculation; the apparatus comprising a circular flat bottomed chamber, a central circular well having openings through its wall spaced apart circumferentially and vertically, a plurality of radially extending rotatable arms supported above the chamber, each arm carrying downwardly depending blades spaced apart along the length of the arms and positioned to intersperse with a plurality of series of vertical fixed blades extending radially from the well, and upwardly from the floor of the chamber, the blades extending substantially the full depth of the chamber, at least one feed chamber in communication with the chamber through an opening in the wall thereof, means for rotating the arms and an outlet from the bottom of the well leading to a settling compartment.

12 Claims, 2 Drawing Figures

4,490,260

MECHANICAL CONDITIONING AND FLOCCULATION OF LIQUIDS

This application is a continuation of application Ser. No. 436,656, filed Oct. 26, 1982, now abandoned.

BACKGROUND OF THE INVENTION

This invention relates to the flocculation and conditioning of the flocculent in liquids prior to separation of solids from the liquids by gravity. It is primarily applicable to the removal of settlable impurities from liquids whereby suitable chemical coagulants are added to the liquid throughout to produce an insoluble flocculent which captures the impurities in the liquid. These impurities are subsequently removed by sedimentation. The condition of the flocculent during its growth is probably the most vital function in the liquid/solid separation stage. In order to provide for maximum efficiency, the chemicals are introduced into the liquid or water to be clarified in an initial mixing in which the liquid is subject to very rapid mixing so as to obtain a maximum dispersion of the added chemicals. This initial mixing may be effected in one or more stages depending on whether one or more chemicals are to be dispersed and whether there is any advantage in adding them to the liquid in sequence. As soon as the initial mixing of the chemicals with the liquid to be treated has been effected the conditioning of the liquid by intimate mixing of the flocculent formed in the liquid with the impurities therein commences. During initial stages of flocculation the treated liquid should ideally be subjected to an initial vigorous or intense conditioning action the intensity of which progressively diminishes as flocculation increases and the flocculent becomes more fragile and more easily broken up by too an intense a conditioning action. Ideally therefore as mentioned the conditioning action commences vigorously and progressively diminishes until the conditioning action is completed and the fully conditioned and flocculated liquid is ready for the sedimentation stage in which the solids are separated from the liquid by gravity.

The purpose of the conditioning therefore is to nurture the growth of the flocculent and repeatedly bring this into contact with the impurities in the liquid so that the impurities are enmeshed by the flocculent to the extent that at the completion of the flocculation virtually all impurities are trapped in the flocculent which is then suspended in a clarified liquid. If the correct chemical coagulants have been administered and the conditioning system has been efficient the flocculent will then rapidly settle in a well designed settling stage leaving a clarified liquid for surface withdrawal.

SUMMARY OF THE INVENTION

It is the object of this invention to provide apparatus whereby efficient flocculation and thereafter separation of solids from liquids can be effected.

According to this invention there is provided flocculation apparatus comprising a circular flat bottomed chamber, a central circular well having openings through its wall spaced apart circumferentially and vertically, a plurality of radially extending rotatable arms supported above the chamber, each arm carrying downwardly depending blades spaced apart along the length the arms and positioned to intersperse with a plurality of series of vertical fixed blades extending radially from the well, and upwardly from the floor of the chamber, the blades extending substantially the full depth of the chamber, at least one feed chamber in communication with the chamber through an opening in the wall thereof, means for rotating the arms and an outlet from the bottom of the tower leading to a settling compartment.

Further features of this invention provide for the feed chamber to comprise the chamber for initial mixing and to have a stirrer supported therein, for an inner end of the opening through the wall of the chamber to have a guide adapted to induce circumferential flow in the chamber from this opening.

This invention also provides for the drive mechanism for the arms to be a motor mounted centrally above the well or to drive a peripheral rim connecting the outer ends of the arms at the top of the chamber wall and for there to be a plurality of initial mixing chambers connected in series to form the feed chamber.

BRIEF DESCRIPTION OF THE DRAWINGS

A preferred embodiment of the invention is described below with reference to the accompanying drawings in which.

DETAILED DESCRIPTION OF THE DRAWINGS

Figure 1:
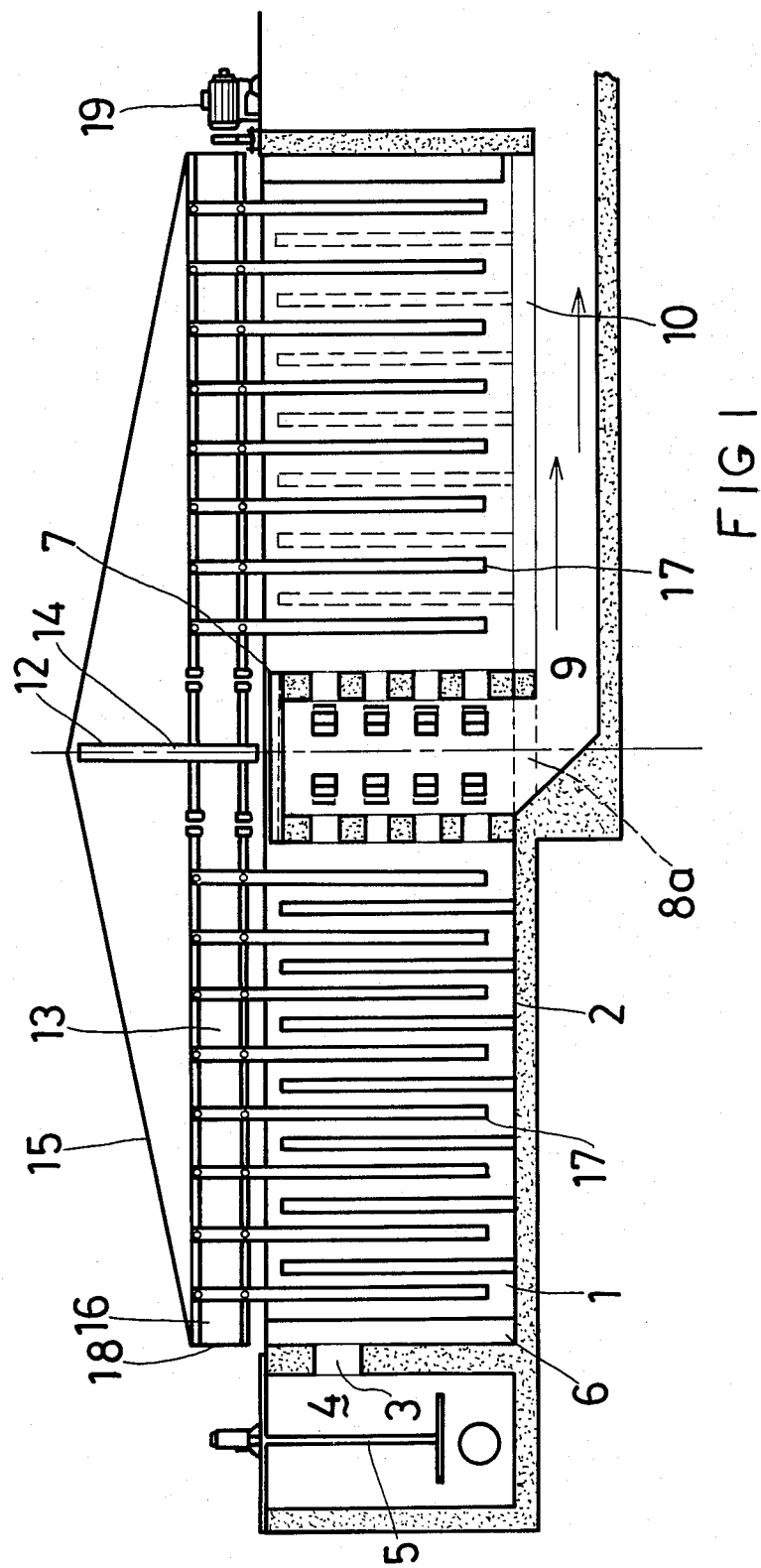
FIG. 1 is a diagrammatic sectional elevation of the flocculation apparatus.

As illustrated the flocculation apparatus is suitably for the treatment of large volumes of water and consists of a main flocculation chamber (1) which has a flat bottom (2) and is of circular shape.

The main chamber (1) has an inlet opening (3) through the wall thereof into a feed chamber (4). The feed chamber has a stirrer (5) supported therein so that coagulation chemical introduced into this feed chamber (4) with the water to be treated can be subjected to a rapid mixing with the water. A guide plate (6) projects from the inner surface of the wall of the main chamber (1) across the inlet opening (3).

A central well (7) is located within the main chamber (1) and extends the full height of the chamber. Openings (8) through the wall of the well are evenly spaced around the periphery of the well and along its height so that an even flow of treated water can pass from the main chamber (1) into the well (7).

The well (7) has an outlet (8a) from its base into a treated water delivery conduit (9) extending radially from the outlet (8a) to the settlement compartment for the separation of the flocculent from the clear water. The delivery conduit (9) can conveniently take the form of an open channel in the bottom (2) of chamber (1) covered by removable sheets (10) of suitable material which isolate the conduit (9) from chamber (1) when the apparatus is in use but enable the conduit (9) to be opened to permit cleaning or other maintenance as may be necessary from time to time.

Fixed to the floor of chamber (1) are a plurality of series of stationary blades (11) which extend substantially the full height of chamber (1). The series are symmetrically arranged and each series extends radially from the well to the inner wall of the chamber (1) and the outermost blade (11) in each series is preferably secured to the chamber wall.

Mounted above the well (7) is a rotatable support (12) for a series of radially extending arms (13). Conveniently there wil be four arms (13) and four series of stationary blades (11) but the final arrangement will be chosen to meet the particular circumstances for which the apparatus is specifically designed. The support (12) will be mounted on bearings on a column (14) which will enable guys or struts (15) to be used to restrain the free ends (16) of the arms above the top of the wall of chamber (1).

From each of the arms (13) depend a series of blades (17) which intersperse between the blades (11) fixed to the chamber floor. Again it will be convenient but not essential for the spacing between the blades of the series to be equal across the radius of the chamber (1).

In the embodiment illustrated the free ends (16) of the arms are connected by a rim (18) which is driven by an electric motor (19) to rotate the arms above the chamber (1). If necessary suitable reduction gearing will be included in the drive between the motor (19) and rim (18).

In use water to be clarified by flocculation is introduced into the feed chamber (4) where coagulant chemicals are added in a desired and controlled manner and rapidly mixed with the water by the stirrer (5).

The water and flocculent flows through the opening (3) into the main chamber (1) and, once the latter is filled, the guide plate (6) gives the incoming water a circumferential initial direction of flow. This prevents any direct flow from the inlet (3) to the well (7).

The arms (13) are rotated and the blades (17) pass between the fixed blades (11) which agitates the water and flocculent to provide satisfactory flocculation. Because the outer blades move more rapidly than the inner blades agitation of the water in the outer reaches of chamber (1) is more vigorous than towards the central part.

Also the inlet (3) and outlet openings (8) results in an inward flow of water to be treated and the outlet arrangement ensures an even substantially horizontal flow at the outlet from the chamber (1). These two factors ensure that the flocculent is intimately mixed with the impurities in the water to ensure proper flocculation while the decreased agitation as flocculation nears completion prevents the flocculent from being broken. The horizontal outlet flow assists in maintaining proper flocculation while nevertheless maintaining efficient gravity separation of the solids from the clarified water in the settlement compartment of the treatment plant of which the flocculation apparatus of this invention will form a part.

Figure 2:
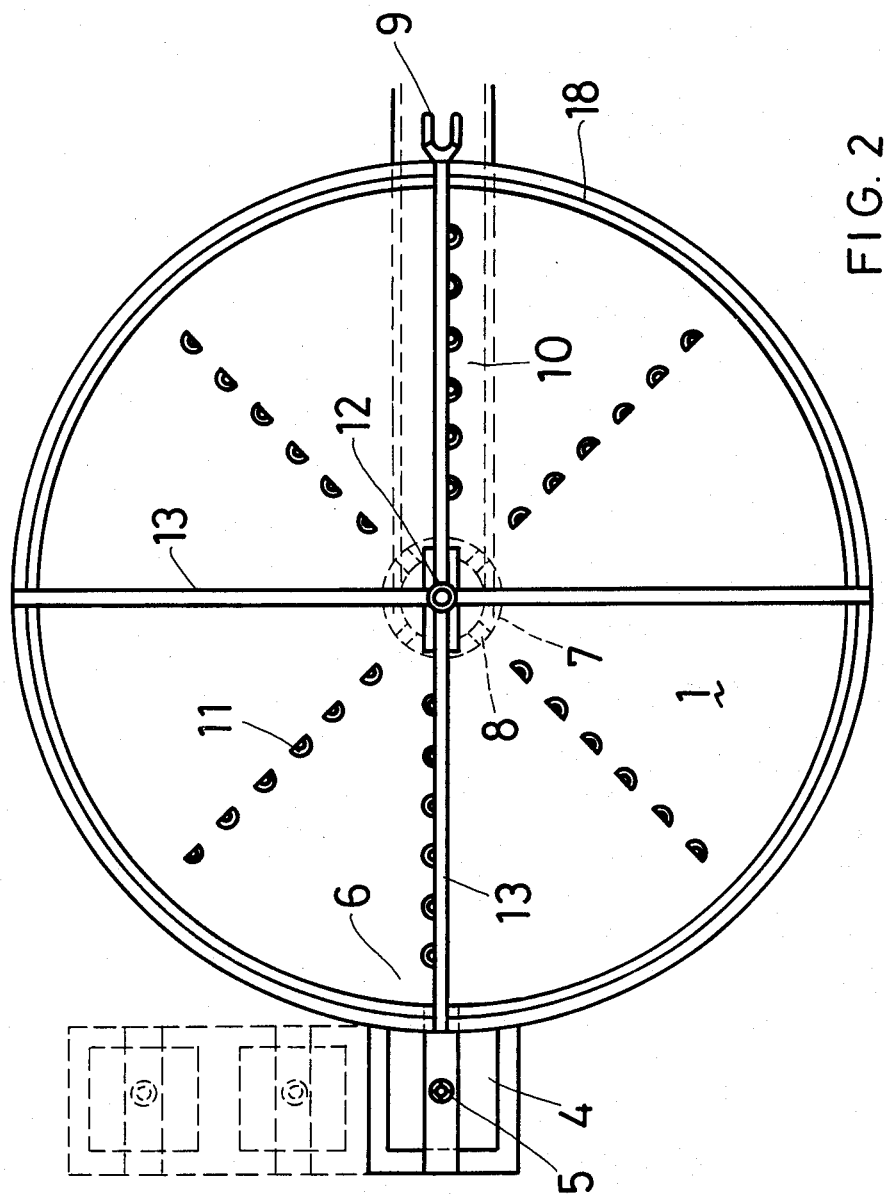
FIG. 2 is diagrammatic plan of the apparatus.

The invention may be varied from the embodiment above described without departing from the scope of the invention. For example a series of initial mixing chambers, as indicated in dotted lines in FIG. 2 may be provided for the sequential addition and mixing of different coagulants to the water.

What I claim as new and desire to secure by Letters Patent is:

1. Flocculation apparatus comprising: a circular flat bottomed chamber; a central circular flocculated liquid collecting well having a plurality of outlet openings through its wall spaced apart circumferentially and vertically to provide an even horizontal outlet flow throughout the depth of liquid in the chamber; a plurality of series of fixed blades extending radially from the well and vertically upward substantially the full depth of the chamber from the bottom of the chamber; a plurality of radially extending rotatable arms supported above the circular chamber, each arm carrying downwardly depending blades spaced apart along the length of the arms and positioned to intersperse with the plurality of series of vertical fixed blades; at least one initial feed chamber in communication with the circular chamber through an opening in the wall thereof; agitating means in the initial feed chamber to vigorously mix a liquid with a coagulant; means to deflect incoming liquid circumferentially around and vertically through the height of the circular chamber; means for rotating the arms; and, an outlet from the bottom of the collecting well to direct the fluid to a settling compartment.

2. Flocculation apparatus as claimed in claim 1, in which the means to deflect the incoming liquid comprises a guide plate located at the inner end of the opening in the wall of the chamber, the guide plate extending substantially the full height of the chamber.

3. Flocculation apparatus as claimed in claim 1 in which the outlet from the bottom of the well comprises an open channel in the bottom of the circular chamber covered by removable sheets.

4. Flocculation apparatus as claimed in claim 1 in which the arms are supported are a rotatable column mounted centrally above the well.

5. Flocculation apparatus as claimed in claim 4 in which free ends of the arms are connected by a peripheral rim above a wall defining the circular chamber and the means for rotating the arms is effected by contact with this rim.

6. Flocculation apparatus as claimed in claim 1 in which the feed chamber comprises an initial mixing chamber having a stirrer supported therein.

7. Flocculation apparatus as claimed in claim 1 wherein the feed chamber comprises a plurality of initial mixing chambers connected in series, each having a stirrer supported therein.

8. A method of flocculation comprising the steps of: introducing a liquid to be treated into an initial feed chamber; adding a coagulant; vigorously agitating the liquid to be treated with the coagulant; passing the treated liquid into a circular treatment chamber; mechanically inducing a horizontal flow throughout the depth of the treated liquid in the circular chamber from the periphery towards the center with diminishing agitation of the flocculent along the flow path; and, withdrawing the flocculated liquid through a central outlet in the chamber.

9. A method as claimed in claim 8, comprising the additional step of imposing an initial peripheral direction on the inward flow of the treated liquid entering the chamber.

10. A method of flocculation as claimed in claim 9 in which the horizontal flow extends through the full height of the liquid in the chamber into a collection well.

11. A method as claimed in claim 10 comprising the step of mixing the liquid by rotating arms extending radially across the circular chamber with vertically depending blades at spaced intervals along the length thereof extending substantially the full height of the chamber and passing between a series of upwardly extending blades fixed to the chamber floor.

12. A method as claimed in claim 10 comprising the additional steps of drawing the treated liquid into a well centrally located in the chamber through apertures in the wall of the well at spaced intervals around its periphery and passing the liquid out through the bottom of the well.

* * * * *